United States Patent Office 3,283,890
Patented Nov. 8, 1966

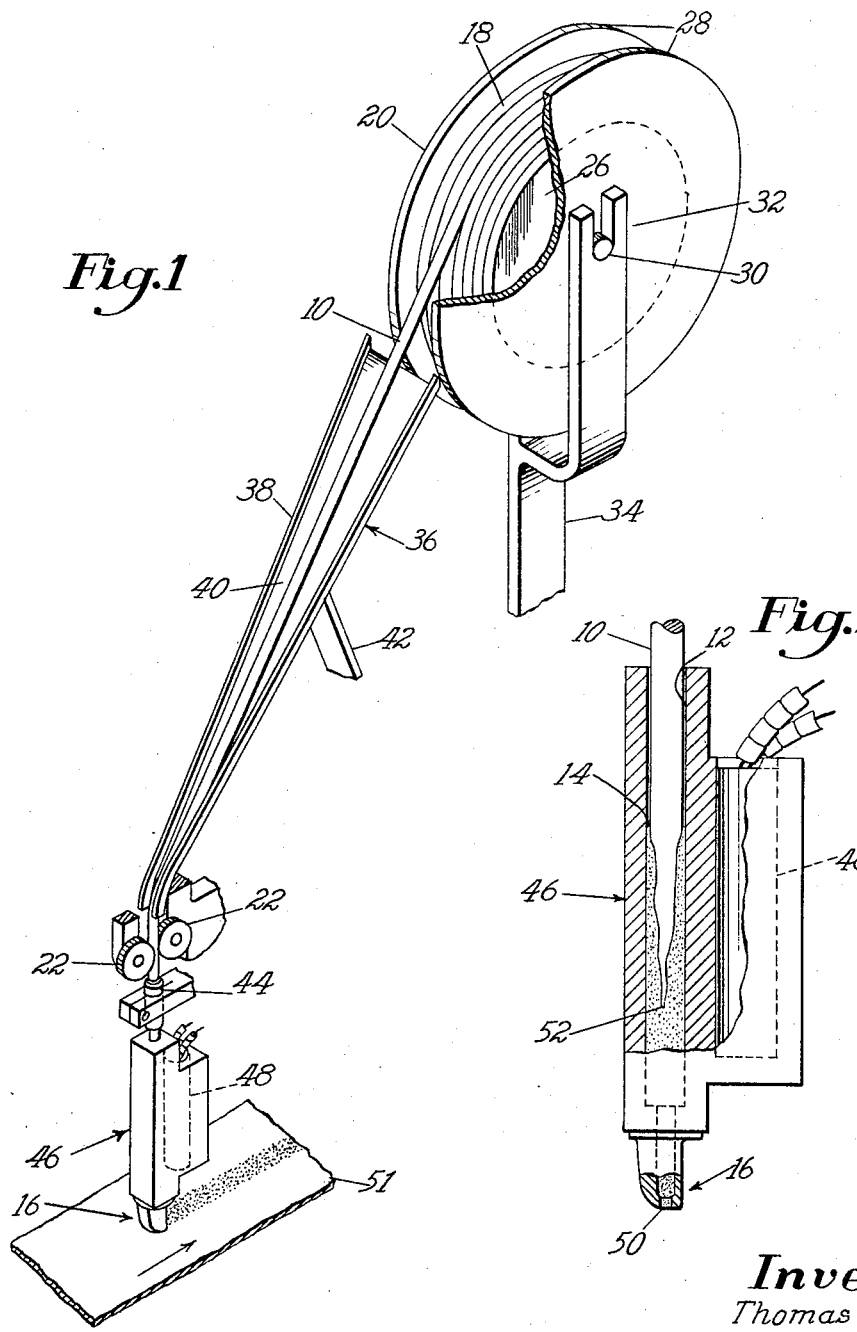
Inventors
Thomas C. Morris
Eric C. Johnson
By his Attorney
Thomas J. Ryan

3,283,890
THERMOPLASTIC ADHESIVE RODS OR STRIPS
Thomas C. Morris, deceased, late of Lexington, Mass., by Edith J. Morris, administratrix, Lexington, Mass., and Eric C. Johnson, Littleton, Mass., assignors to United Shoe Machinery Corporation, Boston, Mass., a corporation of New Jersey
Continuation of application Ser. No. 377,162, Aug. 28, 1953. This application June 22, 1964, Ser. No. 377,137
1 Claim. (Cl. 206—59)

This application is a continuation of application Serial No. 377,162, "Thermoplastic Adhesive Rods or Strips," Thomas C. Morris and Eric C. Johnson, filed August 28, 1953, now abandoned.

This invention relates to a new thermoplastic adhesive article for direct through feed thermoplastic adhesive dispensing.

Thermoplastic adhesive bonding as heretofore known has in general involved introduction of pieces of adhesive into a heated reservoir where a substantial quantity of adhesive is stored in molten condition. Molten adhesive is pumped from the reservoir to the point of application as needed. Although this arrangement is widely used, it has many disadvantages. For example, the reservoir in which the thermoplastic adhesive is heated and melted must be replenished from time to time by the operator who ordinarily has to break the adhesive, which is solid at room temperature, out of the container in which it is received and place the broken pieces in the reservoir. This procedure is not only consumes the operator's time but involves more or less waste. Also, in this arrangement it is necessary to heat up an excessive quantity of the material in the reservoir so as to maintain an ample supply of molten adhesive at the point of application. Because of the insulating character of the adhesive it takes a considerable heating period to render the large quantity of adhesive in the reservoir fluid enough to be handled by the pump. Accordingly, the heating element must be turned on well in advance of the time when the machine is to be used and where the machine is operated with frequent interruptions during a work period the heat must be maintained until the work has been completed if delays are to be avoided. Such continued application of heat for long periods of time often has deleterious effects on the thermoplastic adhesive itself which, in many cases, is composed of chemical compounds that are more or less unstable at elevated temperatures and hence may break down when subjected to heat for long periods. Also when the adhesive is heated in a reservoir it is a rather difficult and time consuming job to clean out the reservoir when changing over from one kind of thermoplastic adhesive to another.

It is a feature of this invention to provide a novel adhesive supply which enables direct through feed thermoplastic adhesive dispensing and eliminates the molten adhesive reservoir and the difficulties mentioned above.

It is a further feature to provide the thermoplastic adhesive supply in compact continuous form particularly adapted for dispensing in a unit type direct through feed thermoplastic adhesive dispenser where space is limited.

"Direct through feed thermoplastic adhesive dispensing" as the expression is used in the present description, is an operation in which solid adhesive material is supplied to a dispensing apparatus at the rate at which heat softened adhesive is applied to a workpiece and in which there is no reservoir or other substantial body of adhesive held in molten condition out of the direct line of flow from the entry to the exit of the dispensing apparatus. In a reservoir, portions of molten adhesive may remain at high temperature for an indefinite period of time and may be harmed seriously by heat; while in the present through feed dispensing system there is an orderly progression of adhesive through a short heated passageway to the point of application and no portion of the adhesive is subject to heating for extended periods.

According to the present invention there is provided an elongated body of solid, thermoplastic adhesive constituting a self-supporting rod of uniform cross section for cooperation as supply and control with a heated softening and dispensing passageway having a complementary cross section. The adhesive rod enters the passageway and is softened by heat and dispensed therefrom with a minimum preliminary warm-up time and is ready for direct through feed operation in which a minimum quantity of adhesive is at a high temperature at any given time. Heat softened portions of the rod in the passageway are carried forward in orderly fashion through the passageway by solid portions of the rod following them into the passageway. The time required for movement through the passageway is relatively short and there is substantially no holdup in the movement of any portion of the adhesive so that the harmful effects of heat on the adhesive material are kept at a minimum and a new and broad latitude is provided in the selection of thermoplastic adhesive materials. Compositions which have been completely outside of the field of materials which could be used for adhesives to be dispensed from a molten reservoir may be employed effectively in this special form. That is, heat decomposition increases with time as well as with temperature and since the present system reduces to an almost negligible amount the time during which heat is applied to the adhesive, even relatively heat unstable materials may be used.

The rod operates in certain forms of the dispensing system as a piston with the softening and dispensing passageway serving as a cylinder to provide particularly effective control over the movement of the adhesive through the passageway. Molten portions of the rod seal the joint between the solid rod and the passageway walls. Because of this seal, adhesive leaves the dispensing end of the passageway at a rate corresponding to the rate of entry of the solid rod into the passageway. Dispensing of the adhesive may be stopped by stopping the forward movement of the rod and dripping of adhesive from the application orifice is substantially eliminated. Similarly, in this system the rate at which adhesive is delivered from the dispensing end of the passageway is subject to close control by controlling the rate of entry of the solid rod.

For effective use of the rod as a control it is important that the rod be essentially continuous since a segmented rod is not capable of use to hold back the supply of adhesive. A coil is the most satisfactory form in which to provide a continuous rod of the adhesive and this coil is uncoiled and fed to the softening and dispensing passageway to provide the necessary adhesive supply and control action.

The thermoplastic adhesive rod constitutes a new tool with the aid of which a great many adhesive problems are solved. It is effective to allow the application of thermoplastic adhesives which can only be applied at a high temperature but which may decompose quickly at such high temperature. On the other hand, it is capable of very accurate control as to quantity, rate, and temperature for demanding problems. The new tool lends itself both to continuous high speed operation and to operations in which there is constant starting and stopping. Since only a small amount of adhesive is present in the melting and dispensing passageway, only an insignificant amount of adhesive is wasted in shutting down and cleaning the system at the end of a run, or in switching from one adhesive to another. In practice, change from one adhesive to another may be accomplished by merely pulling out solid portions of the rod being used, inserting the new rod in the passageway and feeding the new rod in until the small amount of old adhesive has been expelled. The field of uses of the thermoplastic adhesive rod is extremely broad and a wide variety of rods of thermoplastic adhesive may be prepared for the various uses with the special advantage that the heat sensitivity problem has in large measure been eliminated. No serious limitations exist as to physical or chemical properties except that the rod be a thermoplastic adhesive composition, that it possess sufficient flexibility and resistance to fracture at operational temperatures to be coiled and uncoiled and that it be self-supporting and possess dimensional stability such that the rod or strip does not change during storage from the shape required for cooperation with the softening and dispensing passageway.

The invention will be described further in connection with the accompanying drawings forming part of the disclosure, in which FIG. 1 is an angular view of the adhesive supply and control rod in coil form with a portion uncoiled and inserted into a passageway for softening and dispensing the adhesive; and FIG. 2 is a view with parts broken away of the adhesive rod disposed as a piston in a complentary passageway showing the cooperative relation between the body of solid adhesive and the walls of the passageway for controlling flow of adhesive through the passageway to the point of application.

As shown in FIGS. 1 and 2, the thermoplastic adhesive rod 10 for direct through feed adhesive dispensing is an elongated self-supporting body of solid, thermoplastic adhesive having a substantially uniform gross cross section complementary to the cross section of the entrance to heated softening and dispensing passageway 12. The cross section of the rod and passageway may be round or angular, it being only necessary that it correspond to the shape of the passageway. The term "gross cross section" is used in recognition of the fact that cooperation between the passageway 12 and a rod 10 for control of adhesive flow may be obtained both with uniform smooth-surfaced rods and with rods provided with small projections or depressions such as small notches or teeth to aid in feeding. The rod is formed of thermoplastic adhesive compounded to possess a special combination of properties as discussed more fully below. In operation of a through feed adhesive dispensing system the solid, self-supporting rod 10 of the present invention effectively fills the entrance portion of the passageway 12, any slight gap between rod 10 and the walls of the passageway 12 being sealed by softened or molten material 14. In moving forward, the rod 10 bears uniformly against the full cross section of adhesive whether incompletely or wholly in fluid form in the forward portions of the passageway. The clearance between the rod 10 and the walls of the passageway 12 is so small that heat softened or molten portions 14 of the adhesive between the solid rod and the entrance portions of the passageway 12 are wiped toward the forward portions of the passageway and are not squeezed back around the rod by fluid pressure within the passageway.

The uniform bearing of the rod against the entire cross section of adhesive in the passageway insures orderly progress of adhesive through the passageway which constitutes an important advantage of direct through feed adhesive dispensing.

The effective seal between the solid rod and the walls of the passageway creates a relation between them such that as the rod 10 moves into the passageway 12 an equivalent volume of heat softened adhesive leaves the dispensing end 16. When movement of the rod 10 is halted softened adhesive remains in the passageway 12. Thus the rod may serve as a continuous control enabling accurate dispensing of adhesive. Here again for accurate and effective control it is important that the rod be of uniform gross cross section for effective cooperation with the walls of the passageway.

Use of the rod 10 as a supply and/or control member in a direct through feed adhesive dispensing system particularly when the system is used in combination with automatic or semi-automatic machines requires that the rod be substantially continuous, i.e., have an indefinite length sufficient to supply adhesive and provide control for a practical adhesive dispensing period. As a practical matter the continuous rod 10 will ordinarily be supplied as a coil 18 carried on a spool or reel 20 to meet space requirements in dispensing machines and to be capable of shipment. Coiled rods 10 of adhesive compounded to meet the requirements discussed below have been found highly successful for direct through feed adhesive dispensing and have been found useful in many difficult bonding problems.

As shown in FIG. 2, the thermoplastic adhesive rod 10 melts or softens progressively as it enters the heated softening or melting and dispensing passageway 12. The entrance portions of the passageway 12 are somewhat cooler than the central portions due to heat radiation and the cooling effect of the entering rod. The outer portions of the rod melt first but substantially complete melting of the rod 10 occurs before it reaches the application end 16 of the passageway 12. The importance of maintaining only a minimum of adhesive in heated condition in combination with the importance of softening or melting the adhesive rapidly when needed dictates that the thickness of the rod or strip shall be relatively small, in general from about ⅛ to about ½ inch in thickness. The adhesive material from which the rod is formed is capable in heat softened condition of wetting or penetrating the surface to which it is to bond since the adhesive does not employ a volatile solvent. That is, the adhesive forms a quasi chemical union with the surface or effects an intimate penetration and contacting of the surface which will establish a bond during the brief period while it, the adhesive, is in heat softened condition.

An application temperature in the range of 250° to 400° F. is desirable for most operations. The application temperature is higher than the softening or melting temperature of the adhesive to provide increased fluidity of the adhesive to obtain the best combination of adequate penetration of the adhesive into a workpiece or wetting of the surface of the workpiece, as the case may be, together with the desired time of setting of the adhesive by the cooling effect of the atmosphere and of the workpiece. Longer setting time to provide a longer period "open time" within which workpieces may be assembled after application of adhesive may be secured by using an application temperature in the upper portion of the range and/or by using lower softening point adhesive.

The ability to act as a quick holding thermoplastic adhesive is obtained most effectively with application temperatures in the lower portion of the range of application temperatures and higher softening point adhesives. Sharp melting plastic or resinous materials are desirable for this effect and are usually of comparatively low molecular weight and have a tendency to set to a brittle state when cooled from a liquid in the formation of a rod. These materials, in addition to having low viscosity in molten condition, also set rapidly to a hard state on cooling only a few degrees below the temperatures at which they are freely fluid.

In certain applications the thermoplastic adhesive rod 10 is used under conditions such that a substantial axial pressure is applied to it as a piston to create, augment, or assist in maintaining pressure in the melting and dispensing passageway 12 for forcing heat softened forward portions of the rod 10 to the point of adhesive application. For this modification, the rod 10 must possess substantial hardness and stiffness, but even where the rod does not serve as a means for applying substantial pressure, it still must be self-supporting so that it is capable of being threaded into the melting and dispensing passageway and have sufficient hardness and stiffness for feeding forward or for holding back as adhesive requirements dictate.

The harder and stiffer rods 10 which are freely fluid in molten form for use as adhesives are often brittle and may present substantial difficulties in coiling and uncoiling. With the more brittle materials it has been found important to coil the rod in a substantially strain-free condition. That is, many of these rod materials develop internal stresses when subjected to even relatively minor distorting forces in the process of coiling them on a spool, and these stresses may produce a condition in the rod such that it will crack spontaneously or when uncoiled. Elimination or minimizing of these stresses requires avoidance of sharp bending or distortion of the rod when coiling it. Also it is important to coat the rod with anti-stick material such as talc or preferably starch to prevent even slight and temporary sticking together of adajcent turns of a coiled rod since such sticking tends to form a point of initiation for spontaneous fracture when the turns are separated. Care should be taken to avoid localized changes in hardness in the rod such as the development of a brittle surface portion of oxidized, cross-linked, crystallized or cured material which might provide a starting point for a crack. In some instances it has been found that an excess of anti-oxidant helps to reduce danger of cracking. Coiling of the rod within a limited time after forming is desirable. That is, for a period of about 48 hours after formation, e.g. by extrusion, rods of many adhesive formulations exist in what may be termed an "amorphous" condition in which they can be wound or unwound without spontaneous breakage. After this period marked changes in curvature of the rod are believed to create stresses which often result in cracking and breakage. For example, it has been found with many formulations that a rod wound on a small mandrel after this period may crack spontaneously in a short time, e.g. as little as 15 minutes. This cracking after delayed coiling may be prevented by placing such a coiled rod in a tempering oven at 120° F. for 24 hours. The rods should be coiled on a spool whose minimum hub diameter is relatively large, i.e. at least two inches and preferably three inches or more in diameter. Likewise, it is important to avoid mechanical shock to the coiled rod during storage. To avoid mechanical shock it is important that the spool be strong enough to withstand a certain amount of rough handling and that the coil be smoothly and firmly wound on the spool to prevent shifting of the turns of the coil with respect to one another and to the spool.

It has been found important so to compound the adhesive that a rod formed from it has a brittle point at least as low as 60° F. As used herein the term "brittle point" refers to the temperature above which the rod will withstand without breaking a quick bend to a U of which the base has a radius of about an inch.

A further important property of a thermoplastic adhesive rod according to the present invention is that it possesses dimensional stability, i.e., a resistance to progressive deformation under minor loads such as its own weight, which will permit it to be stored on a spool for extended periods, ordinarily at least three to six months without noticeable sticking or running together of adjacent turns on a spool and without substantial departure from the initial cross sectional shape of the rod. It has been found that certain rod materials which seem quite firm may, in the course of standing for extended periods such as two to three months, flow together into a solid mass and be utterly unusable for the purposes of the present invention. The tendency of rods to fail in this respect may be tested by maintaining a strip of the rod on a flat surface in an oven at 120° F. for two weeks. To be acceptable as commercial adhesive rods, the dimensions should not change more than 5% during the period of the test.

The provision of a rod possessing the necessary combination of properties outlined above is obtainable by a skilled compound chemist when once the operation of the rod as a combined adhesive supply and control is presented to him and it is to be understood that in the subsequent discussion of the invention, reference to specific components and specific cements is not to be construed as a limitation of the invention to such details.

The thermoplastic adhesive rod of the present invention may be applied to a workpiece by various continuous through feed dispensing apparatus comprising rod feeding mechanism, a melting passageway with an entrance complementary in shape to the rod, and in adhesive applying orifice or nozzle. Apparatus useful for this purpose is shown in the applications of Wilbur L. MacKenzie, Serial No. 183,697, filed September 8, 1950, abandoned after filing the continuation application of Wilbur L. MacKenzie, deceased, which issued as Patent No. 2,762,716, September 11, 1956; and of Hans C. Paulsen, Serial No. 329,810, filed January 6, 1953, which issued as Patent No. 2,765,768, October 9, 1956.

Use of the thermoplastic rod will be described for purposes of clarity in connection with a simple form of thermoplastic adhesive dispensing system, illustrated in FIGS. 1 and 2, which is similar to that shown in said patent of Wilbur L. MacKenzie.

In this apparatus, thermoplastic rod 10 is coiled on a spool 20 from which it is fed to a melting and dispensing passageway 12. The spool 20 comprises a relatively large diameter hub member 26 and side flanges 28 and is rotatably mounted on a supporting shaft 30 which is fitted in the slotted upper ends 32 of a bifurcated supporting bracket 34. The adhesive rod 10 is wound in overlapping layers around the hub 26, even slight adhesion of adjacent turns or layers of rod being prevented by a liberal deposit of an anti-stick material, for example a dust such as talc or starch, on the strands of the rod 10. Adhesive rod 10 after it is uncoiled from the spool passes through a trough 36 having side walls 38 and a bottom wall 40 supported by a post 42 and into the bite of toothed or notched feed rolls 22 which firmly grip it for applying axial pressure to the rod 10. From the feed rolls 22 the rod 10 passes through a guide bushing 44 and into the entry end of the passageway 12 in the heating and applying member 46. The entry portion of the passageway 12 of the heating and applying member is complementary in shape to and of dimensions providing a sliding fit for the rod 10, the final fluid-tight seal between the rod 10 and the passageway being provided by slight back flow of molten material 14 between the walls of the passageway 12 and solid portions of the rod 10. Subsequent portions of the passageway 12 though not necesarily of the same cross sectional shape are of comparable cross sectional area to the cross sectional area of the entry portion so that no large volume of adhesive is present within this member. The passageway 12 is maintained at a controlled temperature by an electrical heating unit 48 controlled by a suitable thermostat (not shown). The passageway 12 in the heating and dispensing device leads to a nozzle portion having one or more orifices 50 of a size for deposition of heat softened adhesive on a workpiece 51 passed beneath the orifice or orifices.

In dispensing adhesive, the feed rolls 22 draw rod adhesive from the spool 20 and force it through the bushing 44 and into the inlet end of the pasageway 12 in the heating and dispensing member 46 as they are rotated. As the adhesive rod 10 is fed into the passageway it is softened or melted and rendered flowable between the inlet end of the passageway 12 and the application or discharge orifice end of the passageway. Heat applied to the central portion of the passageway 12 by the heating unit 48 is conducted to the inlet end of the passageway 12. However, because of loss of heat through radiation and the cooling effect of portions of the solid adhesive entering the passageway, the temperature at the inlet end is lower than that which exists at the discharge or application orifice end of the passageway. As the solid adhesive rod is fed into the passageway it softens first on its outer surface and this action continues toward the center of the rod as the rod passes through the passageway until the rod is fully softened or melted as indicated by reference character 52, FIG. 2. Preferably the heat applied by the heating unit 48 is controlled so that softening or melting of the outer surface of the rod begins after the rod has passed a short distance into the inlet end of the passageway and the rod is fully softened or melted at some point before the discharge orifice end of the passageway.

As the outer surface of the rod 10 of adhesive begins to soften or melt, the fluid adhesive fills any space between the rod and the inside of the passageway 12 and serves both as a lubricant and as a seal. Thus the solid part of the rod as it is fed to the passageway serves as a continuous piston as well as a continuous adhesive supply and its continued entrance into the passageway may be used to establish pressure to force softened adhesive through the passageway 12 and discharge orifice 50. As the adhesive is forced through the passageway its temperature may be further increased for bringing it to optimum application temperature by a heating unit (not shown) located near the discharge orifice 50. Such increase in the temperature of adhesive may be desirable to offset the tendency of the adhesive to cool unduly as it passes through the orifice 50 and into engagement with a workpiece 51 to which adhesive is to be applied.

When adhesive has been applied to a workpiece 51, the feed rolls 22 may be stopped. Entry of the rod of adhesive into the passageway 12 is arrested and delivery of adhesive through the discharge orifice 50 is terminated.

In the dispensing system described, the thermoplastic adhesive rod serves as a piston cooperating with the passageway as a cylinder to provide the pressure needed for dispensing the adhesive. It is to be understood that in apparatus such as that described in said patent of Hans C. Paulsen referred to above, this function of the rod may not be required after the initial stages of operation although the rod continues to serve its supply and control functions.

The following examples are given to aid in understanding the invention but it is to be understood that the invention is not restricted to the specific compositions or conditions of application or specific properties of the compositions given in the examples:

*Example I*

Parts by weight
Polyethylene (DYLT) mol wt. 18,000 _____ 25
β-Pinene polymer resin-melting point 135° C. (Piccolite S-135) _____ 35
Copolymer of about 98 parts isobutylene and 2 parts isoprene (GRI-17) _____ 40
Antioxidant (Deenax) _____ 2

The molecular weights of polyethylene mentioned herein were determined by measurement of the viscosity of a solution of 4.0 grams/liter of polymer in tetralin at 130° C. and calculating the molecular weight from the modified Staudinger equation where $M = K_{cm} \log 10 \eta r$
$M$ = weight average molecular weight
$\eta r$ = relative viscosity
$K_{cm} = 4.03 \times 10^4$ The antioxidant used in this formula was a commercial antioxidant for rubbers and resins known as "Deenax" which is an alkylated phenol. Other available antioxidants may however be substituted.

The β-pinene polymer resin was introduced into a W.P. mixer and melted by bringing its temperature to 150° C. The copolymer material was then added and mixed in and the temperature was lowered to about 125° to 130° C. When the mixture was smooth, the temperature was again raised to 150° C. and the polyethylene and antioxidant were added and mixed until the composition was smooth. The mixture was extruded as a ¼" rod, the extrusion temperature being maintained between 200 and 250° F.

This rod adhesive was promptly coiled on a spool of which the core or hub had a minimum diameter of only 2" and was readily uncoiled for use with a direct through feed dispensing apparatus. The rod possessed a stiffness and hardness such that it could readily be pushed into the dispensing apparatus and was found to be effective for the bonding of polyethylene sheet material or polyethylene coated sheet material, the temperature of application being approximately 325° F. The material was useful also for certain shoe cementing operations where the speed of set was not critical.

The rod was capable of storage on the spool for a period greater than six months without observable change in cross section. The brittle temperature was below 17° F.

*Example II*

Parts by weight
Polyethylene (DYLT) mol wt. 18,000 _____ 25
β-Pinene polymer resin-melting point 135° C. (Piccolite S-135) _____ 50
Copolymer of about 98 parts isobutylene and 2 parts isoprene (GRI-17) _____ 25
Antioxidant (Deenax) _____ 2

This adhesive was mixed and extruded as a ¼" rod by the procedure outlined in connection with Example I and was useful for the same purposes as the cement of Example I. This adhesive had a brittle temperature of 40° F.

*Example III*

Parts by weight
The resin separated from Utah resin-bearing coal (RBH-510) (described more fully in U.S. Pat. 2,461,552 to Radi, Feb. 15, 1949) consisting essentially of carbon and hydrogen, having an average molecular weight of 1,000 and a refractive index of 1.544 _____ 47.4
Piccolite-S40—a polymer of β-pinene having a 40° melting point _____ 5.2
Dymerex—hard brittle polymerized rosin having a melting point of 208°–217° F., flash point 424° F., acid number 150, and specific gravity 1.072 __ 10.6
Triethylene glycol di-2-ethyl butyrate (3GH) _____ 6.8
Copolymer of 98 parts of isobutylene and 2 parts of isoprene (GRI-50) _____ 15
Polyethylene (DYLT) mol. wt. 18,000 _____ 15
Antioxidant (Deenax) _____ 2

The resin from Utah resin-bearing coal, the β-pinene polymer resin and the polymerized rosin were fluxed in a W.P. mixer at 250° C. The mix was then cooled to 200° C. and the triethylene glycol di-2-ethyl butyrate was added and thoroughly mixed. Thereafter the copolymer of isobutylene and isoprene, the polyethylene and the antioxidant were added and combined as in the procedure set forth in Example I. This material was extruded as a ¼" rod at an extrusion temperature of 200° F. The rod so obtained had a brittle point of 34° F. and was useful for the same purposes as the rod adhesive of Example I but showed a much faster speed of set.

Example IV

| | Parts by weight |
|---|---|
| Ethyl cellulose (N–22) | 33.3 |
| Glyceryl ester of hydrogenated rosin (Staybelite Ester No. 10) | 33.3 |
| Hydrogenated methyl ester of rosin (Hercolyn) | 33.4 |
| Para-tertiary-butyl phenol | 0.5 |

The above components were melted together at a temperature of 250° F. and were extruded as a ⅛″ rod at a temperature of 200° F. This material was useful as a rod adhesive in a direct through feed dispensing device for the bonding of paper.

Example V

| | Parts by weight |
|---|---|
| Polyamide 94S | 90 |
| Tributyl phosphate | 5 |
| Polyamide 100S | 5 |
| Stabilizer A5 | 5 |

The polyamide resins are the reaction products of dimerized fatty acid from soybean oil with ethylene diamine. Further details concerning the preparation and properties of this type of resin are in "Abstract Service" for 1944, page A–18–100, published by Interscience Publishing, Inc., N.Y., N.Y., and "Plastics News Letters," September 11, 1944, ("Plastic No. 345"). Resin 94S has an acid number of about seven, an ash content of 0.10 maximum, a specific gravity of 9.17, average molecular weight of 3000 to 6500 and a ball and ring softening point (A.S.T.M.) of 105° to 115° C. Resin 100S has an acid number of not more than 12, an ash content of 0.10 maximum, a specific gravity of .987, an average molecular weight of 3000 to 6500 and a ball and ring softening point (A.S.T.M.) of at least 43° C.

Stabilizer A5 is the diglycidyl ether made by reacting two mols of epichlorhydrine per mol of diphenylolpropane by a procedure similar to that outlined in column 5, lines 6 to 48 of United States Letters Patent No. 2,506,486, to Bender et al., granted May 2, 1950. It has a viscosity at 25° C. of 9000 to 17,000 cst., an epoxy assay value of 185 to 200 grams/gram mol epoxy, a maximum of 0.2% hydrolyzable chlorine and a specific gravity of 1.15 to 1.17.

The 94S resin and Stabilizer A5 are heated together at 150° C. for fifteen minutes in a glass-lined kettle. Thereafter the 100S resin and the tributyl phosphate were added and mixed thoroughly together. The mixture was extruded as a ⅛″ rod at a temperature of 180° to 190° F. This material was useful as a rod type adhesive for the bonding of paper or leather.

Example VI

| | Parts by weight |
|---|---|
| Polyamide 94S | 525 |
| Polyamide 100S | 30 |
| A mixture of o-p-N-ethyl toluene sulphonamides (Santicizer #8) | 75 |
| Stabilizer A5 | 15 |
| Polymerized rosin (Poly-pale resin) | 52.5 |

The polyamide resins and the polymerized rosin were melted together at a temperature of 150° to 160° C. The Stabilizer A5 was added and the mixture maintained at the same temperature for ten minutes. The sulphonamide material was then added and mixed in thoroughly. The material was extruded as a ¼″ rod at a temperature of 140° to 155° F. The resulting rod had a brittle point of 40° F. and was useful in a direct through feed dispensing system for sealing cardboard boxes.

Example VII

| | Parts by weight |
|---|---|
| Polyethylene (DYGT) mol. wt. 7000 | 350 |
| Petroleum base resin Piccopale 100 | 140 |
| Polymerized rosin (Poly-pale resin) | 280 |
| Hydrogenated methylester of rosin (Hercolyn) | 35 |
| Petroleum oil plasticizer (Kenflex B) | 87.5 |
| Antioxidant (Deenax) | 18.2 |

The piccopale 100 is a resinous polymerization product obtained by catalytic polymerization of a mixture of unsaturated monomers derived from deep cracking petroleum. The monomers have a molecular weight approximating 90 and are composed essentially of dienes and reactive olefins. The resin has a softening point (ball and ring) of approximately 100° C., a specific gravity of 25° C. of .970 to .975, a refractive index at 20° C. of 1.5116, an acid number less than one, an iodine value (Wijs) of 120, a bromine number of 7.3 and a molecular weight of approximately 1100.

Kenflex B is a synthetic polymer of aromatic hydrocarbons. It is soft at room temperature, has a drop melting point of 80° F., a boiling point of 380° F., a flash point of 400° F., a specific gravity 60/60° F. of 1.03 and an index of refraction at 25° C. of 1.5907.

The materials were introduced into a heated kettle, melted together, and extruded as a ¼″ rod. The rod had a brittle point of 58° F. and was useful in combination with a direct through feed melting and dispensing apparatus for the deposition of a priming adhesive layer in bookbinding to form a surface to which glue will adhere.

Example VIII

| | Parts by weight |
|---|---|
| Polyethylene DYGT mol. wt. 7000 | 320 |
| Chlorinated polyethylene containing from 30% to 35% chlorine (Hypalon C–1) | 120 |
| Petroleum base resin (Piccopale 100) | 360 |
| Lead salt stabilizer (Dyphos) | 6 |
| Alkylated phenol (Deenax) | 16.1 |

The hydrocarbon resin, lead salt stabilizer and alkylated phenol were melted in a read mixer with 100 pounds of steam in the heating coils. Chlorinated polyethylene was then added and the mixer operated until the mixture became smooth. The polyethylene was then added and mixing continued for one-half hour. The mixture was extruded at a temperature of 160° to 170° F. as a ¼″ rod. The material was useful in combination with the direct through feed dispensing apparatus for the bonding of polyethylene.

Example IX

| | Parts by weight |
|---|---|
| Copolymer of butadiene and acrylonitrile containing 33% by weight acrylonitrile (Hycar OR 25–1032) | 50 |
| Elastomeric alkyd resin derived from rosin (Neolyn 23) softening point 74–80° C. Acid number 5 or less | 100 |
| Chlorinated paraffin containing 70% chlorine (Chlorowax 70) | 50 |

These materials are mixed on a rubber mill at 255° F. for twenty minutes and were extruded as a ⅛″ rod at 185° to 200° F. The material was useful in combination with a direct through feed dispensing apparatus for bonding vinyl polymer resins.

Example X

| | Parts by weight |
|---|---|
| Polyethylene mol. wet. 10,000 (DYJT) | 25 |
| Copolymer of 98 parts isobutylene and 2 parts isoprene (GRI–50) | 25 |

These materials were mixed in a Banbury mixer at 275° F. and extruded as a ⅛" rod at a temperature of 170° F. The adhesive rod was useful for coating or bonding leather when employed with direct through feed melting and dispensing apparatus.

Having thus described our invention, what we claim as new and desire to secure by Letters Patent of the United States is:

A package of solid flexible thermoplastic adhesive in coil form, said coil comprising a plurality of turns of rod of substantially uniform cross-section, said rod being formed of a thickness of between about ⅛ and ½ inch of a normally solid, flexible thermoplastic mixture of at least two ingredients at least one of which is a normally solid, thermoplastic, high molecular weight synthetic polymer and the other of which is a relatively low molecular weight short chain thermoplastic resinous polymer, said mixture being fluid with a viscosity suitably low for adhesive application at temperatures in the range of 250° F. to 400° F., the physical properties of said rod including the characteristics that said rod is self-supporting, dry, non-tacky, flexible and sufficiently hard to be coiled for use as needed without cracking, said rod being sufficiently stiff to be capable of being fed from said coil and being reducible progressively and rapidly by heat in said temperature range to a fluid condition in quantities as needed for use in a direct through feed industrial cement applying and dispensing system.

References Cited by the Examiner

UNITED STATES PATENTS

| | | | |
|---|---|---|---|
| 1,923,456 | 8/1933 | Price | 206—52 |
| 2,047,264 | 7/1936 | Halligan | 206—46 |
| 2,070,600 | 2/1937 | Jenett. | |
| 2,339,958 | 1/1944 | Sparks | 260—45.5 |
| 2,369,471 | 2/1945 | Latham | 260—45.5 |
| 2,385,612 | 9/1945 | Coutlee | 206—59 |
| 2,557,574 | 6/1951 | Shonberg | 206—59 |
| 2,569,540 | 10/1951 | Selby | 260—897 X |
| 2,615,857 | 10/1952 | Clarke | 260—897 X |
| 2,655,492 | 10/1953 | Young et al. | 260—897 |
| 2,656,297 | 10/1953 | Davis et al. | 260—45.5 |
| 2,701,054 | 2/1955 | Howald et al. | 206—52 |
| 2,864,882 | 12/1958 | Snell | 260—897 X |

THERON E. CONDON, *Primary Examiner.*

J. M. CASKIE, *Assistant Examiner.*